US012420190B2

(12) United States Patent
Ye

(10) Patent No.: US 12,420,190 B2
(45) Date of Patent: Sep. 23, 2025

(54) IN-GAME INFORMATION PROCESSING METHOD AND APPARATUS, ELECTRONIC DEVICE, AND STORAGE MEDIUM

(71) Applicant: NETEASE (HANGZHOU) NETWORK CO., LTD., Zhejiang (CN)

(72) Inventor: Yurou Ye, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 113 days.

(21) Appl. No.: 18/270,196

(22) PCT Filed: Mar. 10, 2022

(86) PCT No.: PCT/CN2022/080099
§ 371 (c)(1),
(2) Date: Jun. 28, 2023

(87) PCT Pub. No.: WO2022/257516
PCT Pub. Date: Dec. 15, 2022

(65) Prior Publication Data
US 2024/0100431 A1    Mar. 28, 2024

(30) Foreign Application Priority Data
Jun. 10, 2021 (CN) .................... 202110650014.8

(51) Int. Cl.
*A63F 13/5372* (2014.01)
*A63F 13/42* (2014.01)
(Continued)

(52) U.S. Cl.
CPC ......... *A63F 13/5372* (2014.09); *A63F 13/42* (2014.09); *A63F 13/5378* (2014.09); *A63F 13/822* (2014.09)

(58) Field of Classification Search
CPC ........ A63F 13/42; A63F 13/426; A63F 13/44; A63F 13/45; A63F 13/50; A63F 13/52;
(Continued)

(56) References Cited

U.S. PATENT DOCUMENTS 10,688,399 B2 *   6/2020   Essiounine ............. A63F 13/35
2009/0318234 A1 *  12/2009   Christensen ............ A63F 13/10
                                                          463/42
(Continued)

FOREIGN PATENT DOCUMENTS

CN    101192254 A    6/2008
CN    110124310 A    8/2019
(Continued)

OTHER PUBLICATIONS

International Search Report (and English Translation) and Written Opinion with regard to PCT/CN2022/080099 mailed Jun. 7, 2022.
(Continued)

*Primary Examiner* — Omkar A Deodhar
(74) *Attorney, Agent, or Firm* — BCF LLP

(57) ABSTRACT

An in-game information processing method and apparatus, an electronic device and a storage medium, where the method includes: in response to a first operation for an item control, displaying at least one item slot corresponding to a first game character in a first graphical user interface, the at least one item slot comprising a first-type item slot and a second-type item slot, where the first-type item slot represents an item not possessed by the first game character, and the second-type item slot represents an item possessed by the first game character; in response to a second operation for the first-type item slot, generating first-type item request information corresponding to the first-type item slot; and sending the first-type item request information to a second game client corresponding to a second game character.

20 Claims, 6 Drawing Sheets

(51) Int. Cl.
*A63F 13/5378* (2014.01)
*A63F 13/822* (2014.01)

(58) Field of Classification Search
CPC ........ A63F 13/537; A63F 13/55; A63F 13/56; A63F 13/58; A63F 13/4372; A63F 13/5378; A63F 13/70; A63F 13/79; A63F 13/822

See application file for complete search history.

(56) References Cited

U.S. PATENT DOCUMENTS

| | | | |
|---|---|---|---|
| 2011/0055919 A1* | 3/2011 | Hamilton, II | G06F 21/10 715/757 |
| 2019/0160379 A1* | 5/2019 | Matsushita | A63F 13/58 |
| 2019/0208037 A1* | 7/2019 | Yang | A63F 13/358 |
| 2019/0255446 A1* | 8/2019 | Essiounine | A63F 13/87 |
| 2019/0299092 A1* | 10/2019 | Higuchi | A63F 13/45 |
| 2020/0311305 A1* | 10/2020 | Kim | H04N 1/4486 |
| 2020/0393959 A1* | 12/2020 | Qiu | G06F 3/04842 |
| 2022/0305385 A1* | 9/2022 | Konno | A63F 13/56 |

FOREIGN PATENT DOCUMENTS

| | | |
|---|---|---|
| CN | 112274928 A | 1/2021 |
| CN | 112494943 A | 3/2021 |
| CN | 113398587 A | 9/2021 |
| WO | 2020114275 A1 | 6/2020 |

OTHER PUBLICATIONS

English Abstract for CN113398587 retrieved on Espacenet on Jun. 21, 2023.
English Abstract for CN112494943 retrieved on Espacenet on Jun. 21, 2023.
English Abstract for CN112274928 retrieved on Espacenet on Jun. 21, 2023.
English Abstract for CN101192254 retrieved on Espacenet on Jun. 21, 2023.
English Abstract for CN110124310 retrieved on Espacenet on Jun. 21, 2023.

* cited by examiner

IN-GAME INFORMATION PROCESSING METHOD AND APPARATUS, ELECTRONIC DEVICE, AND STORAGE MEDIUM

CROSS-REFERENCE TO RELATED APPLICATIONS

The present disclosure is a U.S. National Stage Application of PCT International Application No. PCT/CN2022/080099, filed on Mar. 10, 2022, which is based upon and claims priority to the Chinese Patent Application No. 202110650014.8 filed on Jun. 10, 2021 and entitled "IN-GAME INFORMATION PROCESSING METHOD AND APPARATUS, ELECTRONIC DEVICE AND STORAGE MEDIUM," the entire contents of both of which are hereby incorporated by reference for all purposes.

TECHNICAL FIELD

The present disclosure relates to the technical field of gaming, and in particular to an in-game information processing method and apparatus, an electronic device and a storage medium.

BACKGROUND

In a related shooting game, a player may team with other players against players in other teams. In a shooting game, the supply sharing among players in teams can be realized in a voice communication mode or a non-voice mode.

SUMMARY

An in-game information processing method, including: displaying, in response to a first operation for an item control in a game, at least one item slot corresponding to a first game character in a first graphical user interface, where the game includes a plurality of game characters, the plurality of game characters includes the first game character and a second game character, the second game character is in a same group as the first game character, the first graphical user interface is provided through a first game client corresponding to the first game character, the at least one item slot includes a first-type item slot and a second-type item slot, where the first-type item slot corresponds to an item not possessed by the first game character, and the second-type item slot corresponds to an item possessed by the first game character; generating, in response to a second operation for the first-type item slot, first-type item request information corresponding to the first-type item slot; and sending the first-type item request information to a second game client corresponding to the second game character.

An in-game information processing method, including: displaying, in response to receiving first item allocation information sent by a first game client corresponding to a first game character, the first item allocation information in a second graphical user interface, and displaying a first position of a first game character in a small map of the second graphical user interface, where the game includes a plurality of game characters, the plurality of game characters including the first game character and the second game character in a same group as the first game character, where the second graphical user interface is provided through a second game client corresponding to the second game character, where the first item allocation information includes: first-type item request information, second-type item request information and second-type item gifting information; and sending, in response to a response operation for the first item allocation information, first response information for the first item allocation information to the first game client, where, after receiving the first response information, the first game client displays the first response information in a first graphical user interface, and displays a second position of the second game character corresponding to the second game client in a small map of the first graphical user interface.

A non-transitory computer-readable storage medium, having a computer program stored thereon, where the computer program, when executed by a processor, performs steps of an in-game information processing method, where the method includes: displaying, in response to a first operation for an item control in a game, at least one item slot corresponding to a first game character in a first graphical user interface, where the game includes a plurality of game characters, the plurality of game characters include the first game character and a second game character, the second game character is in a same group as the first game character, the first graphical user interface is provided through a first game client corresponding to the first game character, the at least one item slot includes a first-type item slot and a second-type item slot, where the first-type item slot corresponds to an item not possessed by the first game character, and the second-type item slot corresponds to an item possessed by the first game character; generating, in response to a second operation for the first-type item slot, first-type item request information corresponding to the first-type item slot; and sending the first-type item request information to a second game client corresponding to the second game character.

BRIEF DESCRIPTION OF DRAWINGS

In order to more clearly illustrate the technical schemes of the embodiments of the present disclosure, the drawings required in the embodiments will be briefly described below. It should be understood that the following drawings only illustrate some embodiments of the present disclosure and therefore should not be considered as limitations of the scope, and for those of ordinary skill in the art, other related drawings can be obtained according to these drawings without creative efforts.

DETAILED DESCRIPTION

Figure 1A:
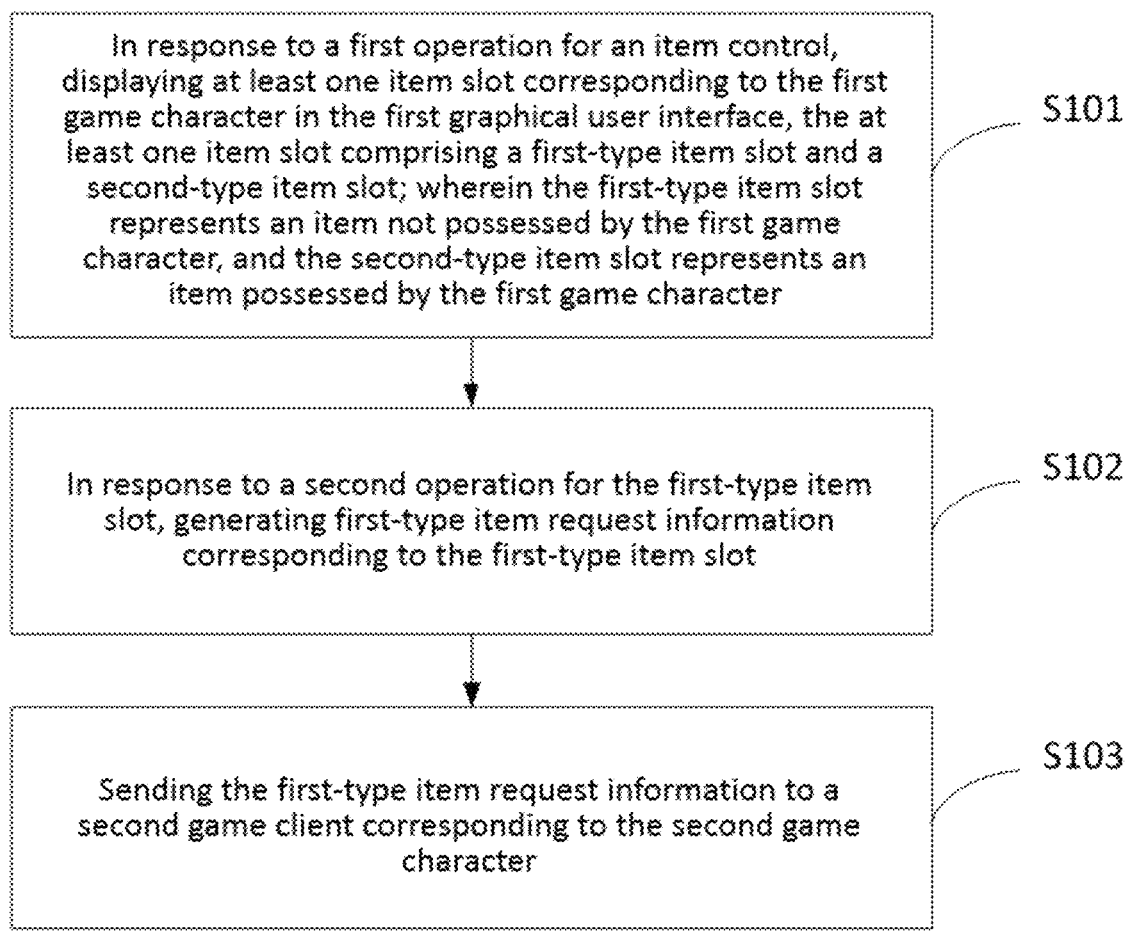
FIG. 1a is a flowchart showing an in-game information processing method provided in an embodiment of the present disclosure.

In order to make the objectives, technical schemes and advantages of the embodiments of the present disclosure clearer, the technical schemes in the embodiments of the present disclosure will be clearly and completely described below with reference to the drawings in the embodiments of the present disclosure. It should be understood that the drawings in the present disclosure are only for purposes of illustration and description and are not used to limit the protection scope of the present disclosure. In addition, it should be understood that the schematic drawings are not drawn to scale. The flowcharts used in the present disclosure show operations implemented according to some embodiments of the present disclosure. It should be understood that the operations in the flowcharts may be performed out of order, and that steps without logical context may be performed in reverse order or concurrently. Furthermore, those skilled in the art, with the guidance of the present disclosure, may add one or more other operations to, or remove one or more operations from, the flowcharts.

In addition, the described embodiments are only part of the embodiments of the present disclosure rather than all of the embodiments. The components of the embodiments of the present disclosure, as generally described and illustrated in the figures herein, can be arranged and designed in a wide variety of different configurations. Therefore, the following detailed description of the embodiments of the present disclosure provided in the accompanying drawings is not intended to limit the scope of the present disclosure as claimed, but is merely representative of selected embodiments of the present disclosure. Based on the embodiments of the present disclosure, all other embodiments obtained by those skilled in the art without creative efforts fall within the protection scope of the present disclosure.

It should be noted that the term "including", "include" or "includes" will be used in the embodiments of the present disclosure to indicate the presence of the features stated hereinafter, but does not exclude the addition of other features, where terms "item" and "supply" may be exchanged in the present disclosure.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Among communication modes between players to share supplies in some related games, for the non-voice mode, the adopted mode might be the mode of item marking or quick voice. Specifically, item marking means marking an item, and then teammates are notified that "there are supplies at the mark", or a quick voice "I have supplies here" in a message box is triggered, or the players aim at an item on the ground and trigger "there are XX supplies here" in the message box. However, in the above non-voice communication mode, the teammates might only be quickly notified of existing supplies, and when a player does not possess an item but needs the item, the player would only notify teammates by entering text, so that the communication might not be convenient enough, the conveyed information might not be accurate enough, and the quick communication for items on the ground might be limited. When the players in the same team are not friends that are familiar with one another or it is inconvenient to turn on the voice when ganging up, it may be difficult to allocate supplies in the team, and the communication efficiency may be low, which greatly affects the gaming experience of team cooperation.

Based on this, a first embodiment of the present disclosure provides an in-game information processing method and apparatus, an electronic device and a storage medium, where a player can notify teammates of item allocation information including a first position of a first game character and the allocation type and item identification of an item to be allocated through the allocation operation on an item slot, which may improve convenience and accuracy of allocating supplies that are not possessed among teammates in a non-voice function, may improve communication efficiency among teammates in a non-voice function, may reduce complexity of operations for players, and may improve the gaming experience of team cooperation.

For the convenience of understanding the present embodiment, the following detailed descriptions are provided for the in-game information processing method and apparatus, the electronic device and the storage medium provided in the embodiments of the present disclosure.

As shown in FIG. 1a, the in-game information processing method provided in an embodiment of the present disclosure is illustrated, where the game includes a plurality of game characters, the plurality of game characters including a first game character and a second game character in a same group as the first game character, a first graphical user interface is provided through a first game client corresponding to the first game character, and the method includes:

S101, in response to a first operation for an item control, displaying at least one item slot corresponding to the first game character in the first graphical user interface, the at least one item slot including a first-type item slot and a second-type item slot, where the first-type item slot represents an item not possessed by the first game character, and the second-type item slot represents an item possessed by the first game character;

S102, in response to a second operation for the first-type item slot, generating first-type item request information corresponding to the first-type item slot; and S103, ending the first-type item request information to a second game client corresponding to the second game character.

The in-game information processing method provided in an embodiment of the present disclosure may improve the convenience and accuracy of allocating supplies that are not possessed among teammates in a non-voice function, improve the communication efficiency among teammates in a non-voice function, reduce the complexity of operations for players, and may improve the gaming experience of team cooperation.

The above in-game information processing method may be applied to a first game client, and may also be applied to a server. The above steps in the embodiments of the present disclosure will be described below by taking the application of the above in-game information processing method to a first game client as an example.

S101, in response to a first operation for an item control, displaying at least one item slot corresponding to the first game character in the first graphical user interface, the at least one item slot including a first-type item slot and a second-type item slot, where the first-type item slot represents an item not possessed by the first game character, and the second-type item slot represents an item possessed by the first game character.

In the embodiment of the present disclosure, a game client is pre-installed in a terminal device, and a first game client is installed in a first terminal device, where the first game client provides a first graphical user interface, that is, the first game client provides the first graphical user interface through the first terminal device; the game includes a plurality of game characters, and the plurality of game characters includes a first game character and a second game character in a same group as the first game character; the first game character is a game character controlled by a player, the second game character is a teammate character of the first game character, the above first graphical user interface displays a game scene of the game, and the game scene at least includes the first game character in a third-person perspective.

The above first game character needs items (i.e., supplies) to play the game, for example, a player controls the first game character to pick up an item in a game scene. The above item can be placed on the first game character (for example, the item is placed in a backpack of the first game character when the first game character has a backpack). Accordingly, as shown in FIG. Tb, an item control 11 (i.e., a backpack control) is provided on the first graphical user interface 10, a player performs a first operation (e.g., a touch-and-click operation) on the item control 11, a display interface 12 is provided on the first graphical user interface 10, the display interface 12 covers part of the game scene in the first graphical user interface 10, at least one item slot 13 corresponding to the first game character is displayed on the display interface 12, and each item slot 13 corresponds to one item. Here, the above at least one item slot includes a first-type item slot and a second-type item slot, where an item in the first-type item slot is an item not possessed by the first game character 20 (e.g., the item included in the game scene and not picked up by the first game character), and an item in the second-type item slot is an item possessed by the first game character 20 (e.g., the item picked up by the first game character).

Specifically, the above item slot 13 includes an item identification corresponding to the item, where when the item corresponding to the item slot 13 is an item not possessed by the first game character 20, the item slot 13 (i.e., the first-type item slot) includes a first type of item identification corresponding to the item, where the first type of item identification is a name of the item or a silhouette of the item. When the item corresponding to the item slot 13 is an item possessed by the first game character 20, the item slot 13 (i.e., the second-type item slot) includes a second type of item identification corresponding to the item, where the second type is different from the first type, and the second type of item identification at least includes a conventional icon of the item and may further include a name and the number of the item.

In some examples, the above item at least includes: a weapon, a prop and a healing item, where the above prop includes: a first prop matched with the weapon and an independent second prop. Specifically, the above weapon may be a firearm, such as a sniper rifle, a submachine gun, a shotgun or a pistol; the weapon may further be a non-firearm, such as a frying pan; the first prop in the above props is, for example, a gunstock, a cartridge clip and a silencer which are matched with each type of firearm, where the first props matched with different types of firearms may be the same (e.g., completely or partially the same) or different (e.g., completely or partially different). The independent second prop in the above props may be: various magnifications of optical sights (for example, a 2× optical sight, a 4× optical sight), various types of bullets (for example, a 5.56 bullet, a 7.62 bullet) and a cartridge clip; and the above healing item may be first aid kits, bandages, pain relievers, energy drink and the like.

Specifically, after the player triggers the item control 11 (i.e., the backpack control), a backpack item panel and an equipment item panel are displayed on the graphical user interface, where the backpack item panel contains a healing item and a second prop, and may further include part of the first props; and the equipment item panel includes a firearm and at least part of the first props.

S102, in response to a second operation for the first-type item slot, generating first-type item request information corresponding to the first-type item slot.

In some examples, the above second operation includes one of the following operations 1 and 2:

1, a click operation for the first-type item slot; and
2, a drag operation for dragging the first-type item slot to a first designated area (having a request indication identification, such as "I need"); for example, the first-type item slot is dragged to a first designated area including a request indication identification of "I need", so that after the first-type item slot is dragged to the first designated area and the hand is released, an allocation operation may be triggered; or just after the first-type item slot is dragged to the first designated area, an allocation operation is triggered.

As for a specific operation (for example, it may be a long-press operation or a heavy-press operation) for the first-type item slot and a click operation for the first designated area that immediately follows the specific operation right after the specific operation, the interval time between the above specific operation and the above click operation is less than a preset threshold, and no other operations are involved in the interval time. The allocation type is determined according to the identification type of the designated area. Here, the specific operation is different from the first operation, and the specific operation may be a long-press operation or a heavy-press operation; and the above click operation may be a touch-and-click operation. For example, the player triggers and selects the first-type item slot by a long-press operation, and triggers the touch click on the first designated area again after selecting the first-type item slot, that is, triggers the allocation operation. In this way, the player can select a plurality of first-type item slots (i.e., a plurality of first-type items) to share through the third operation.

The first designated area corresponds to a request indication identification, the request indication identification being configured to determine a request allocation type of an item corresponding to the item slot. Here, the allocation type of the item corresponding to the item slot is determined according to the indication identification of the designated area. For example, the indication identification of the first designated area is "I need", the first designated area is determined to correspond to the "request allocation type"; the indication identification of the second designated area is "who needs", and the second designated area is determined to correspond to the "presentation allocation type".

In response to the above second operation, a determined target first-type item slot corresponding to the second operation is determined, and first-type item request information of the first game character is generated according to a first position of the first game character and an item identification of an item corresponding to the target first-type item slot, where the first-type item request information may be that at the position identification (where the position identification is also displayed on a small map), XX (an identification of the first game character, e.g., Little Raindrop) needs (not possessed) a 5.56 bullet.

S103, sending the first-type item request information to a second game client corresponding to the second game character.

Here, the first game client generates first-type item request information, and then sends the first-type item request information to a second game client corresponding to the second game character. Here, the second game character is a teammate character of the first game character. Accordingly, after receiving first item allocation information sent by a first game client corresponding to the first game character, the second game client displays the first-type item request information on a second graphical user interface provided by a second terminal device (where the following first item allocation information includes the first-type item request information), and displays a first position of the first game character in a small map of the second graphical user interface, where the first-type item request information includes: the first position of the first game character, and the request allocation type and the item identification of the item to be allocated (here, the specific content of the first-type item request information is the same as that of the first-type item request information in S102).

Here, the second game client displays a first position identification at the first position where the first game character is located in a small map of the second graphical user interface, and displays the first position identification in a first specific manner. Here, the first specific manner may be displaying the first position identification in a first flickering manner. The first flickering manner is, for example, multilayer water-ripple flickering. The position identifications corresponding to different game characters in the team are different. For example, a first game character corresponds to a first position identification (e.g., a yellow identification), a second game character corresponds to a second position identification (e.g., a blue identification), another second game character corresponds to a second position identification (e.g., a green identification), and so on.

In some examples, in the in-game information processing method provided in an embodiment of the present disclosure, the method further includes:

in response to a third operation for the second-type item slot, generating second-type item request information corresponding to the second-type item slot, and sending the second-type item request information to a second game client corresponding to the second game character.

In the embodiment of the present disclosure, the third operation includes one of the following operations 1, 2 and 3:

1, a double-click operation for the second-type item slot;
2, a click operation for the second-type item slot, and a click operation for a specific control (e.g., a trumpet button in a graphical user interface, and in practice, the specific control is located in a display interface as described below) that immediately follows the click operation right after the click operation; and
3, a drag operation for dragging the second-type item slot to a first designated area (the first designated area is the same as the above first designated area, that is, it has a request indication identification, for example, "I need"); and a specific operation (for example, it may be a long-press operation or a heavy-press operation) for the second-type item slot, and a click operation for the first designated area that immediately follows the specific operation right after the specific operation, where the interval time between the above specific operation and the above click operation is less than a preset threshold, and no other operations are involved in the interval time. The first designated area corresponds to a request indication identification, and the request indication identification is configured to determine a request allocation type of an item corresponding to the item slot.

In response to the above third operation, a determined target second-type item slot corresponding to the third operation is determined, and second-type item request information of the first game character is generated according to a first position of the first game character and an item identification of an item corresponding to the target second-type item slot, where the second-type item request information may be that at the position identification (where the position identification is also displayed on a small map) XX (an identification of the first game character, e.g., Little Raindrop) needs (possessed) a 5.56 bullet.

In some examples, in the in-game information processing method provided in an embodiment of the present disclosure, the method further includes:

in response to a fourth operation for the second-type item slot, generating second-type item gifting information corresponding to the second-type item slot; and sending the second-type item gifting information to a second game client corresponding to the second game character.

The above fourth operation includes one of the following:

1, a drag operation for dragging the second-type item slot to a second designated area (including a presentation indication identification, for example, "who needs"), for example, dragging a second-type item slot to a second designated area corresponding to a presentation indication identification of "who needs"; and 2, a specific operation (which is same as the above specific operation, for example, it may be a long-press operation or a heavy-press operation) for the second-type item slot, and a click operation for the second designated area that immediately follows the specific operation right after the specific operation, where the interval time between the above specific operation and the above click operation is less than a preset threshold, and no other operations are involved in the interval time, and where the second designated area corresponds to a presentation indication identification, and the presentation indication identification is configured to determine a presentation allocation type of an item corresponding to the item slot.

In response to the above fourth operation, a determined target second-type item slot corresponding to the fourth operation is determined, and second-type item gifting information of the first game character is generated according to a first position of the first game character and an item identification of an item corresponding to the target second-type item slot, where the second-type item gifting information may be that a 5.56 bullet at the position identification (where the position identification is also displayed on a small map) is possessed by XX (an identification of the first game character, e.g., Little Raindrop), please come and get it if you need it.

In some examples, in the in-game information processing method provided in an embodiment of the present disclosure, the generating, in response to a second operation for the first-type item slot, first-type item request information corresponding to the first-type item slot includes:

in response to a second operation for the first-type item slot, determining a target item slot corresponding to the second operation and a request allocation type of the target item slot, and generating first-type item request information of the first game character according to the request allocation type.

Figure 1B:
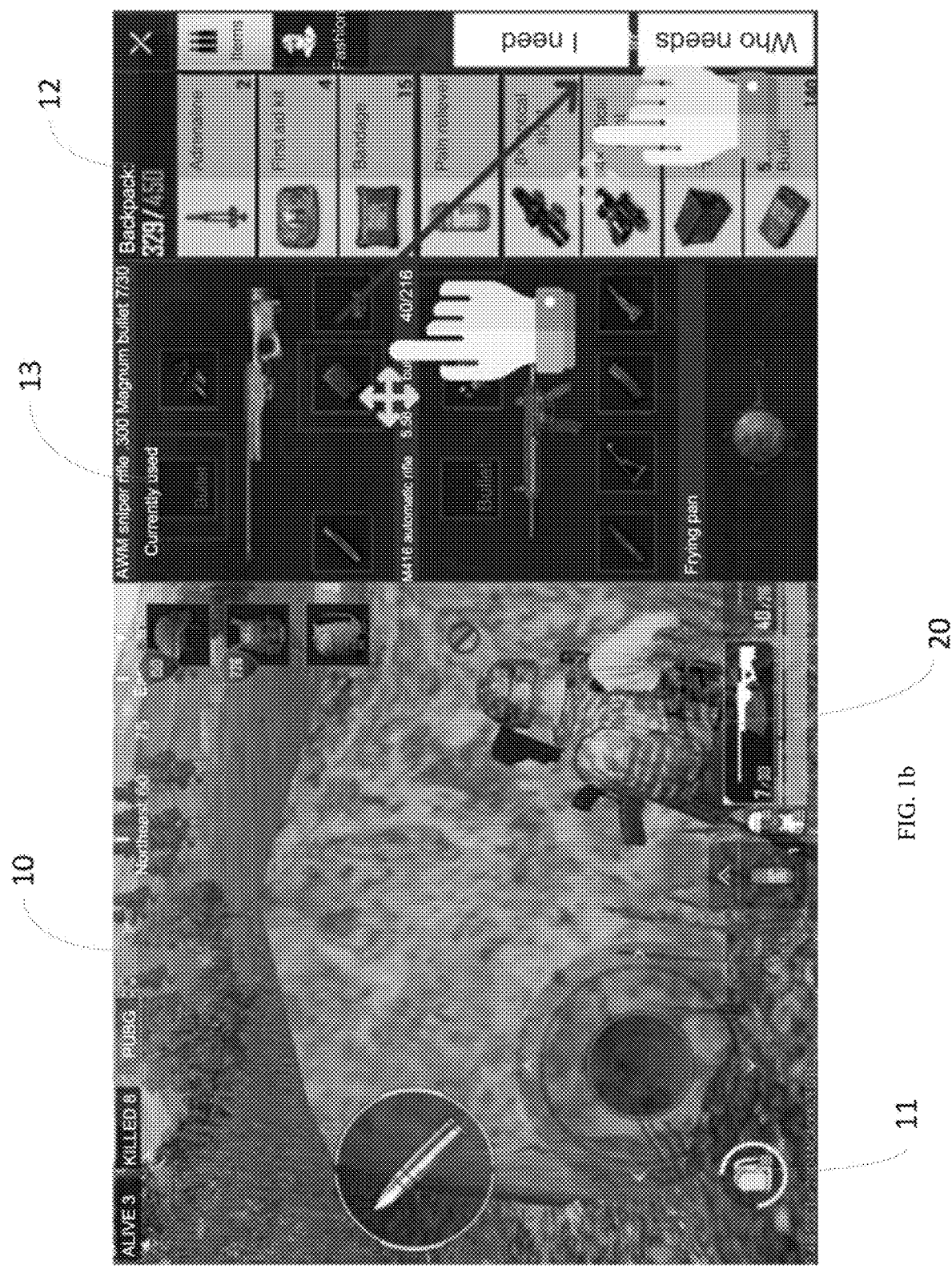
FIG. 1b is a schematic diagram of displaying an item slot corresponding to the first game character in a first graphical user interface provided in an embodiment of the present disclosure.

In the embodiment of the present disclosure, as shown in FIG. 1b, a display interface 12 (i.e., a display window) is provided in the first graphical user interface 10, and an item slot 13 corresponding to the first game character 20 is displayed on the display interface 12, where, the designated area (including the first designated area and the second designated area mentioned above) is an area in the above display interface; the first designated area corresponds to a request indication identification (as shown in FIG. 1b, the request indication identification is "I need"); the second designated area corresponds to a presentation indication identification (shown in FIG. 1b, the presentation indication identification is "who needs").

Specifically, the above display interface 12 includes: a first area 14, a second area 15 and a designated area 16, where the first area 14 (corresponding to the above equipment item panel) is configured to display item slots corresponding to the weapon and a first prop matched with the weapon, respectively; the second area 15 (corresponding to the above backpack item panel) is configured for item slots corresponding to the independent second prop and the healing item, respectively; the designated area 16 is configured to determine an allocation type of the item to be allocated; and the second area 15 is arranged adjacent to the first area 14, and the designated area 16 is arranged adjacent to the second area.

The player can determine a target item slot (specifically a target first-type item slot) and a request allocation type corresponding to the target item slot from the above item by triggering the second operation for the item slot, and then first-type item request information of the first game character is generated according to the request allocation type; specifically, first-type item request information of the first game character is generated according to the request allocation type, a first position of the first game character and an item identification of an item corresponding to the target item slot.

Specifically, the first-type item request information is that, for example, Pumpkin No. 1 (corresponding to a first identification of the first game character) needs (corresponding to a request allocation type) a Magnum bullet (corresponding to an item identification), and Pumpkin No. 1 corresponds to a position identification (the position identification corresponds to a specific position on the small map).

Similarly, the above third operation is also similar, while the item requested by the corresponding second-type item request information is different from that in the first-type item request information.

Similarly, the above fourth operation is also similar, while the corresponding second-type item gifting information is different from the second-type item request information and the first-type item request information. For example, the second-type item gifting information is that Pumpkin No. 1 (a first identification of the first game character) has enough pain relievers (corresponding to an item identification), the teammates needing the pain reliever can come and get it, and Pumpkin No. 1 corresponds to a position identification (the position identification corresponds to a specific position on the small map).

In addition, in the embodiment of the present disclosure, after sending the first-type item request information to a second game client corresponding to the second game character, the method further includes: canceling an item slot corresponding to the first game character displayed in the first graphical user interface.

Here, canceling the display of the item slot displayed in the first graphical user interface means that canceling a display interface provided in the first graphical user interface, so as to close the displayed item slot corresponding to the first game character.

In some examples, in the in-game information processing method provided in an embodiment of the present disclosure, the method includes:

if receiving first response information from the second game client for the first item allocation information, displaying the first response information in the first graphical user interface, and displaying a second position of a second game character corresponding to the second game client in a small map of the first graphical user interface, where the first item allocation information is at least one of the following sent by the first game client to the second game client: first-type item request information, second-type item request information and second-type item gifting information.

Specifically, after a player (i.e., a teammate player) of the second game character triggers a response operation (for example, a touch-and-click operation) for the first item allocation information, the second game client responds to the response operation and sends first response information for the first item allocation information to the first game client corresponding to the first game character; after receiving the first response information, the first game client displays the first response information in the first graphical user interface, and displays a second position of the second game character corresponding to the second game client in a small map of the first graphical user interface.

Specifically, the first game client displays a second position identification at a second position where the second game character is located in a small map of the first graphical user interface, and displays the second position identification in a second specific manner. Here, the second specific manner may be displaying the second position identification in a second flickering manner. The second flickering manner is, for example, multi-layer curve-ripple flickering. Here, the flickering ripple and/or the flickering color of the second specific manner are different from those of the first specific manner.

In addition, when the first response information is for the first-type item request information or the second-type item request information, then if the first response information includes a target item for responding to the first-type item request information or the second-type item request information, an indication identification for identifying the target item is displayed at a position where the target item is located on a small map.

In some examples, if the target item is on the second game character, the target item may be separately identified in a small map, or the target item may be directly indicated by a second position identification of a second position where the second game character is located in the small map; and if the target item is not on the second game character (for example, the target item is thrown on the ground), the target item needs to be indicated by a separate indication identification.

Figure 2:
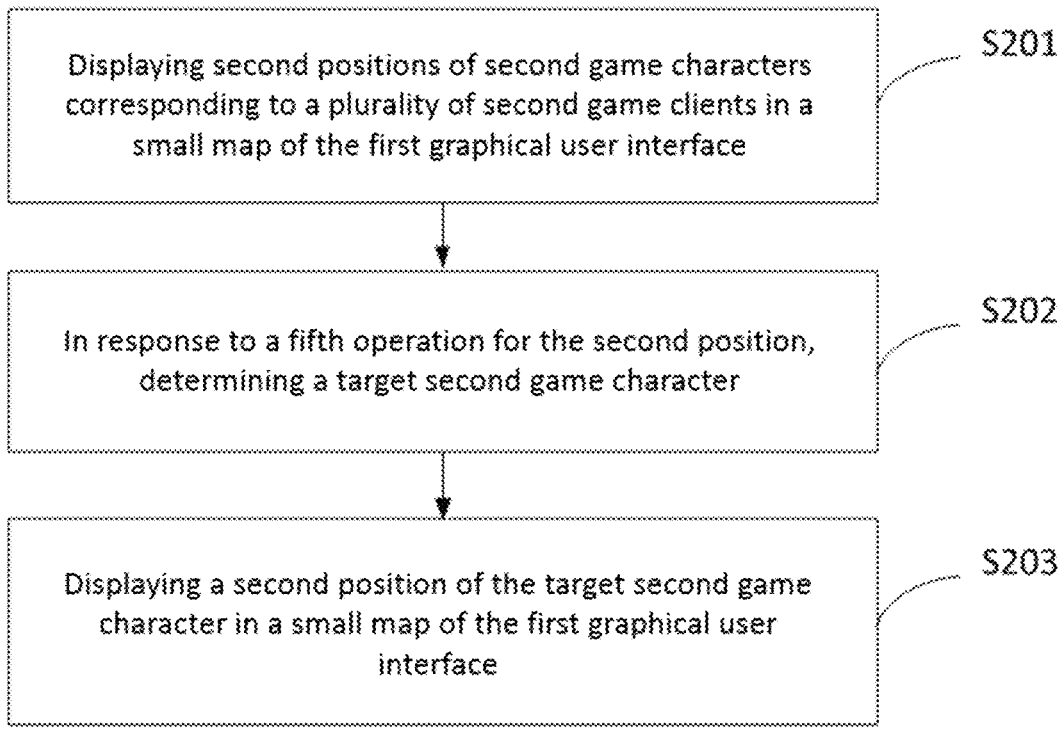
FIG. 2 is a flowchart of another in-game information processing method provided in an embodiment of the present disclosure.

In some examples, as shown in FIG. 2, in the in-game information processing method provided in the embodiment of the present disclosure, the displaying a second position of a second game character corresponding to the second game client in a small map of the first graphical user interface includes:

S201, displaying second positions of second game characters corresponding to a plurality of second game clients in a small map of the first graphical user interface;

S202, in response to a fifth operation for the second position, determining a target second game character; and S203, displaying a second position of the target second game character in a small map of the first graphical user interface.

With reference to steps 201 to 203, after the first game character sends the first item allocation information, there may be feedback from a plurality of second game characters. For example, in a team of four players, there is first item allocation information that the first game character needs a 5.56 bullet, and all the other three second game characters feed back the first response information to the first game client; at this time, second positions of the above plurality of second game characters are displayed on the first graphical user interface corresponding to the first game client, and at this time, the player selects the target game character from the plurality of second positions through a fifth operation (for example, a touch-and-click operation) triggered by the plurality of second positions, and displays the second position of the target second game character in a small map of the first graphical user interface. In this way, the second position of the target second game character selected by the player can be displayed on the small map, which is convenient for the player to allocate supplies.

In some examples, in the in-game information processing method provided in the embodiment of the present disclosure, after displaying a second position of a second game character corresponding to the second game client in a small map of the first graphical user interface, the method further includes:

if the display duration of the first response information and the second position meets a preset threshold, canceling the display of the first response information in the first graphical user interface, and canceling a second position of a second game character corresponding to the second game client displayed in a small map of the first graphical user interface.

In the embodiment of the present disclosure, considering that the continuous display of the first response information for a teammate and the second position of a teammate will clutter the interface; based on this, when the display duration of the first response information meets a preset threshold (for example, after displaying for 5 s), and the display duration of the second position meets a preset threshold (for example, after displaying for 5 s), the displayed first response information and the displayed second position are canceled.

Figure 3:
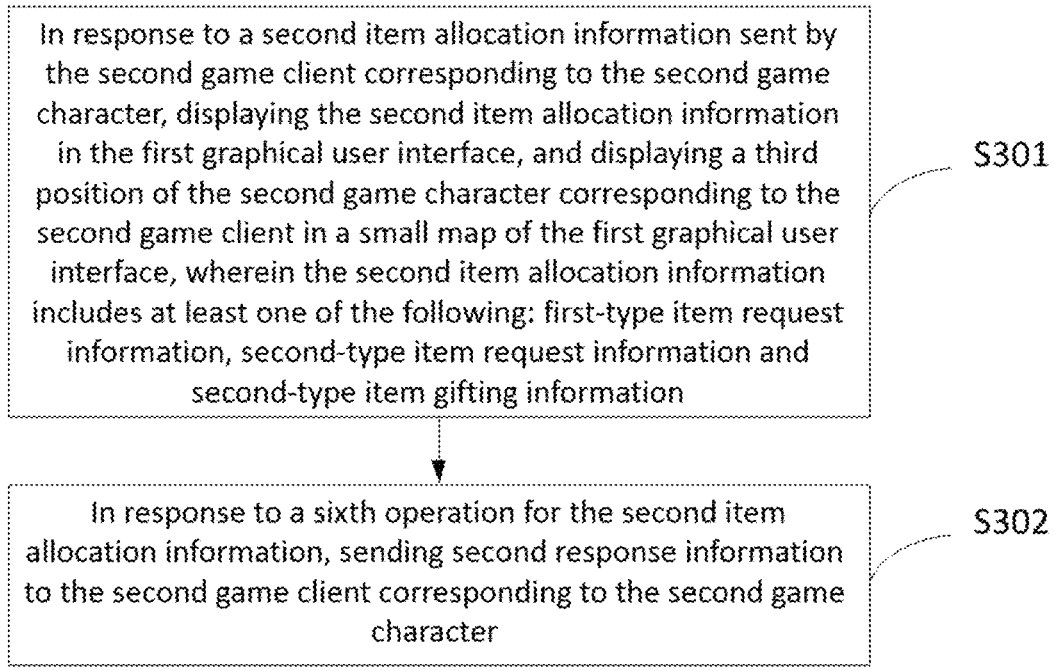
FIG. 3 is a flowchart of another in-game information processing method provided in an embodiment of the present disclosure.

In addition, after the second game client generates second item allocation information of a second game character, the second item allocation information is also sent to the first game client corresponding to the first game character and other second game clients (in practice, the second item allocation information is sent to the first game client and other second game clients through a server, and simultaneously sent to the second game client that generates the second item allocation information), as shown in FIG. 3, the method further includes:

S301, in response to a second item allocation information sent by the second game client corresponding to the second game character, displaying the second item allocation information in the first graphical user interface, and displaying a third position of the second game character corresponding to the second game client in a small map of the first graphical user interface, where the second item allocation information includes at least one of the following: first-type item request information, second-type item request information and second-type item gifting information.

Figure 1C:
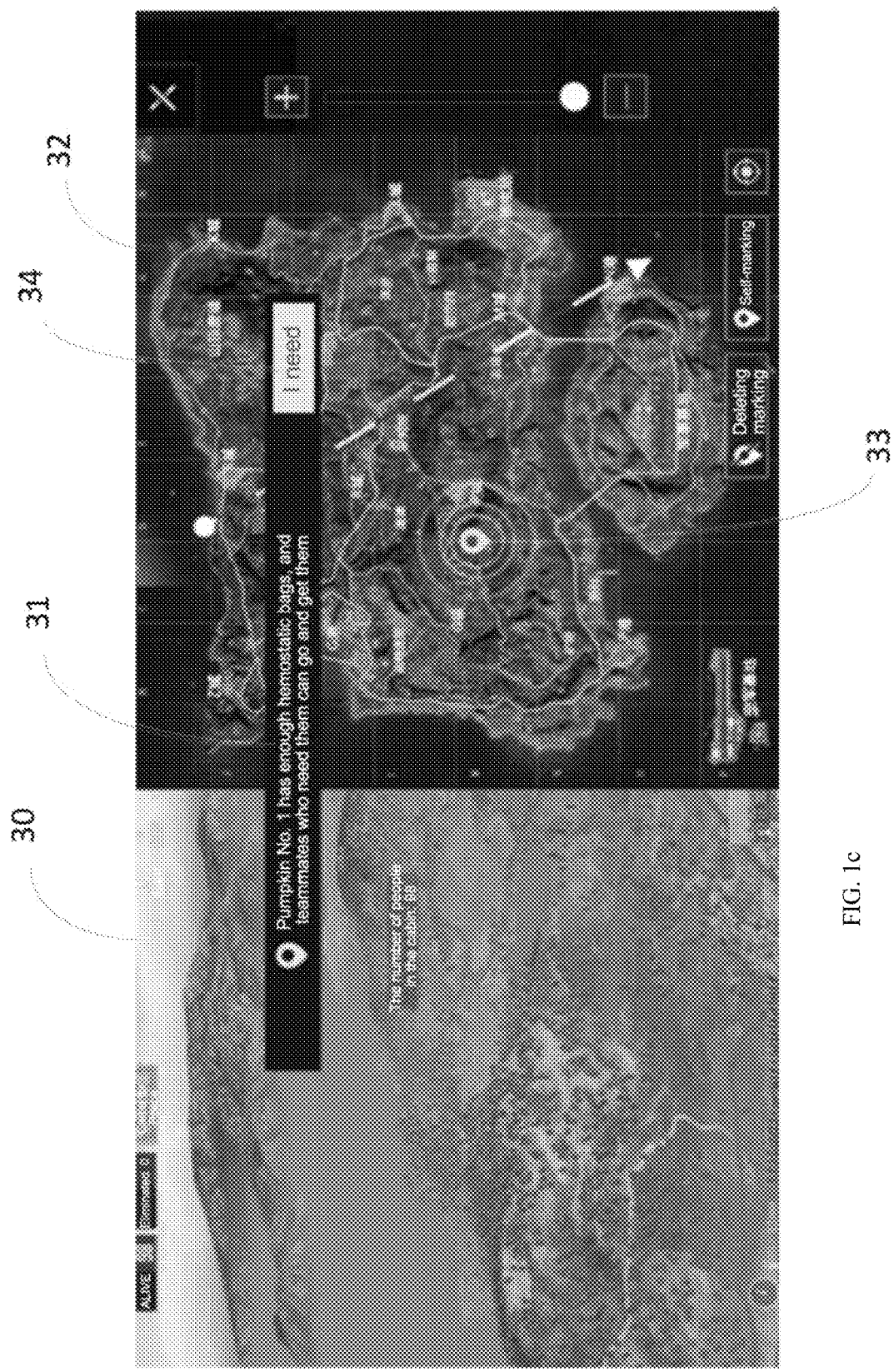
FIG. 1c is a schematic diagram of displaying first item allocation information in a second graphical user interface provided by a second game client and displaying a first position of a first game character in a small map of the second graphical user interface provided in an embodiment of the present disclosure.

As shown in FIG. 1*c*, after receiving the second item allocation information, the first game client displays the first item allocation information 17 in the first graphical user interface 10, and displays a third position of the second game character in a small map of the first graphical user interface 10, where the second item allocation information includes: a third position of the second game character, and an allocation type and an item identification of an item to be allocated (here, the specific content of the second item allocation information is similar to that of the first item allocation information in S102).

Here, the first game client displays a third position identification at the third position where the first game character is located in a small map of the first graphic user interface 10, and displays the third position identification in a third specific manner. Here, the third specific manner may be displaying the first position identification in a third flickering manner. The third flickering manner is different from a ripple shape or color of the first and/or second flickering.

In addition, if a sixth operation for the second item allocation information is not received within a preset time period, the display of the second item allocation information and the third position is canceled.

Here, if the second item allocation information is second-type item gifting information, an indication identification for identifying the target item is displayed at a position where the target item included in the second-type item gifting information is located on a small map.

In some examples, if the target item is on the second game character, the target item may be separately identified in a small map, or the target item may be directly indicated by a second position identification of a second position where the second game character is located in the small map; if the target item is not on the second game character (for example, the target item is thrown on the ground), the target item needs to be indicated by a separate indication identification.

S302, in response to a sixth operation for the second item allocation information, sending second response information to the second game client corresponding to the second game character.

In the embodiment of the present disclosure, when the second item allocation information is displayed in the first graphical user interface, a first response control for the second item allocation information is provided in the first graphical user interface; the sixth operation is an operation for the first response control, and may be, for example, a touch-and-click operation.

When the player triggers the touch operation for the first response control, the first game client sends second response information to the second game client corresponding to the second game character (here, the first game client may send the second response information to the second game client corresponding to the second game character through a server).

In the actual game, when a plurality of pieces of item allocation information is received, a list is provided in the first graphical user interface, which can display a predetermined number of item allocation information, for example, 5; and on this premise, when new item allocation information is received again, the item allocation information with the earliest reception time in the list is deleted.

The following describes the in-game information processing method provided in the embodiment of the present disclosure with specific examples.

A player triggers a backpack control, and item slots corresponding to a first game character are displayed in a first graphical user interface, each item slot corresponds to an item, and the item slot includes a first-type item slot and a second-type item slot, where the first-type item slot represents an item not possessed by the first game character, and the second-type item slot represents an item possessed by the first game character.

In one embodiment, a player clicks a first-type item slot, such that first-type item request information corresponding to the first-type item slot is generated and sent to a second game client of a teammate and a first game client of the player; and the player double-clicks a second-type item slot, or clicks a "trumpet" button after clicking the second-type item slot, such that second-type item request information corresponding to the second-type item slot is generated and sent to the second game client of the teammate and the first game client of the player.

In another embodiment, each item slot (also called slot) in a backpack can be dragged, and when the item slot is moved to a designated area of "I need" or "who needs", a full-team supply allocation reminder is triggered. Specifically, when a first-type item slot is moved to a first designated area of "I need", first-type item request information is generated; when a second-type item slot is moved to a first designated area of "I need", second-type item request information is generated; when the first-type item slot is moved to a second designated area of "who needs", first-type item gifting information is generated; and when the second-type item slot is moved to a second designated area of "who needs", second-type item gifting information is generated.

By adopting the method, the players can clearly know the supplies that they lack and the supplies that are abundant and can be shared when viewing and checking the backpack. In some examples, the content of the request information corresponding to the second-type item slot is more than that of the request information corresponding to the first-type item slot. Because the player does not possess an item corresponding to the first-type item slot, the generated information is that who (corresponding to a position identification) needs a firearm of a non-pistol type or needs a pistol, and however, it cannot define whether the "firearm of a non-pistol type" is a submachine gun or a rifle, nor can it define the type of a rifle. However, in a case that a firearm is determined, a bullet can be determined, for example, the rifle 416 is determined, then the information needing a 5.56 bullet may be sent directly.

After the current player sends the first item allocation information, other players receive the information, then the position of the current player is displayed on the small map, and the flickering reminder lasts for 5 s. If other players have items needed by the current player, or want items of the current player, the other players can click a response button of "I need" or "I possess", and similarly, the positions of other responded players are displayed in a small map corresponding to the current player, and the flashing reminder will last for 5 s. The position of the player sending the message can be prompted more accurately, and other teammates can respond more quickly by using the above feature. Even if the voice is not turned on, the rapid question and answer among teammates can be realized.

In the in-game information processing method provided in an embodiment of the present disclosure, a player can notify teammates of item allocation information including a first position of a first game character and the allocation type and item identification of an item to be allocated through the allocation operation on an item slot, which may improve convenience and accuracy of allocating supplies that are not possessed and are possessed among teammates in a non-voice function, improve communication efficiency among teammates in a non-voice function, reduce complexity of operations for players, and improve the gaming experience of team cooperation.

Figure 4:
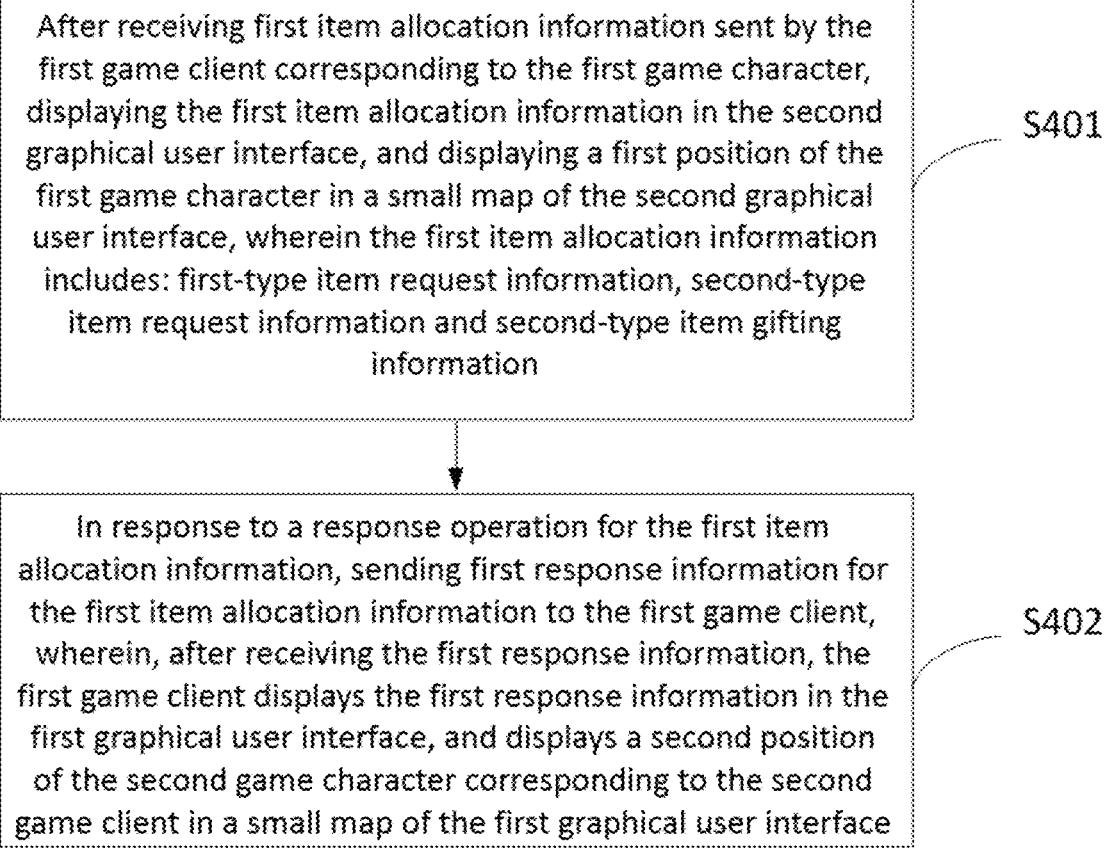
FIG. 4 is a flowchart of another in-game information processing method provided in an embodiment of the present disclosure.

As shown in FIG. 4, the in-game information processing method provided in a second embodiment of the present disclosure is illustrated, where the game includes a plurality of game characters, the plurality of game characters including a first game character and a second game character in a same group as the first game character, a second graphical user interface is provided through a second game client corresponding to the second game character, and the method includes:

S401, after receiving first item allocation information sent by the first game client corresponding to the first game character, displaying the first item allocation information in the second graphical user interface, and displaying a first position of the first game character in a small map of the second graphical user interface, where the first item allocation information includes: first-type item request information, second-type item request information and second-type item gifting information; and S402, in response to a response operation for the first item allocation information, sending first response information for the first item allocation information to the first game client, where, after receiving the first response information, the first game client displays the first response information in the first graphical user interface, and displays a second position of the second game character corresponding to the second game client in a small map of the first graphical user interface.

The in-game information processing method provided in an embodiment of the present disclosure may improve the convenience and accuracy of allocating supplies that are possessed and/or not possessed among teammates in a non-voice function, improve the communication efficiency among teammates in a non-voice function, reduce the complexity of operations for players, and improve the gaming experience of team cooperation.

The above steps in the embodiments of the present disclosure will be described below by taking the application of the above in-game information processing method to a second game client as an example.

S401, after receiving first item allocation information sent by the first game client corresponding to the first game character, displaying the first item allocation information in the second graphical user interface, and displaying a first position of the first game character in a small map of the second graphical user interface, where the first item allocation information includes: first-type item request information, second-type item request information and second-type item gifting information.

Specifically, as shown in FIG. 1c, after receiving first item allocation information sent by a first game client corresponding to the first game character, the second game client displays the first-type item request information 31 on a second graphical user interface 30 provided by a second terminal device, and displays a first position of the first game character in a small map 32 of the second graphical user interface 30, where the first item allocation information includes: first-type item request information, second-type item request information and second-type item gifting information.

Here, the second game client displays a first position identification 33 at the first position where the first game character is located in a small map 32 of the second graphical user interface 30, and displays the first position identification 33 in a first specific manner. Here, the first specific manner may be displaying the first position identification in a first flickering manner. The first flickering manner is, for example, multi-layer water-ripple flickering. The position identifications corresponding to different game characters in the team are different. For example, a first game character corresponds to a first position identification (e.g., a yellow identification), a second game character corresponds to a second position identification (e.g., a blue identification), another second game character corresponds to a second position identification (e.g., a green identification), and so on.

S402, in response to a response operation for the first item allocation information, sending first response information for the first item allocation information to the first game client, where, after receiving the first response information, the first game client displays the first response information in the first graphical user interface, and displays a second position of the second game character corresponding to the second game client in a small map of the first graphical user interface.

Specifically, as shown in FIG. 1c, when the first item allocation information 31 is displayed in the second graphical user interface 30, a second response control 34 for the first item allocation information is provided in the second graphical user interface 30; in some examples, the second response control 34 is located at a tail part of the first item allocation information; and the above response operation is a touch operation for the second response control 34.

When the player triggers the touch operation for the second response control, the second game client sends first response information to the first game client corresponding to the first game character (here, the second game client may send the first response information to the first game client corresponding to the first game character through a server).

A third embodiment of the present disclosure further provides an in-game information processing apparatus corresponding to the in-game information processing method in the first embodiment. Since the principle of solving the problem by the apparatus in the third embodiment of the present disclosure is similar to that of the in-game information processing method in the above first embodiment of the present disclosure, the implementation of the apparatus may refer to the implementation of the method, and the repeated parts are not described again.

Figure 5:
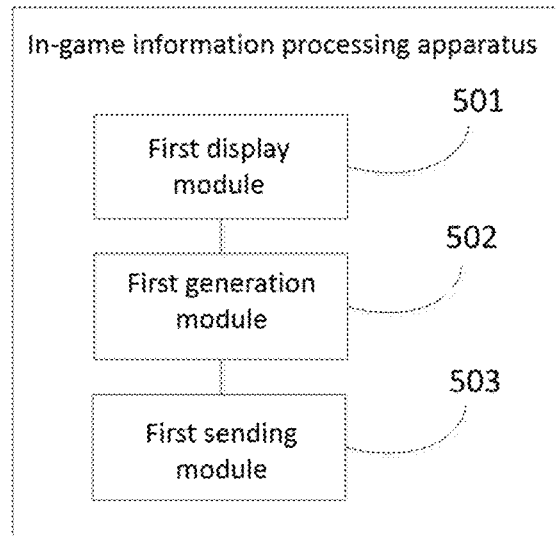
FIG. 5 is a schematic diagram of the structure of an in-game information processing apparatus provided in an embodiment of the present disclosure.

As shown with reference to FIG. 5, the in-game information processing apparatus provided in an embodiment of the present disclosure is illustrated, where the game includes a plurality of game characters, the plurality of game characters including a first game character and a second game character in a same group as the first game character, a first graphical user interface is provided through a first game client corresponding to the first game character, and the apparatus includes:

a first display module 501, configured to, in response to a first operation for an item control, display at least one item slot corresponding to the first game character in the first graphical user interface, the at least one item slot including a first-type item slot and a second-type item slot, where the first-type item slot represents an item not possessed by the first game character, and the second-type item slot represents an item possessed by the first game character;

a first generating module 502, configured to, in response to a second operation for the first-type item slot, generate first-type item request information corresponding to the first-type item slot; and a first sending module 503, configured to send the first-type item request information to a second game client corresponding to the second game character.

In one possible embodiment, the apparatus further includes:

a second generation module, configured to, in response to a third operation for the second-type item slot, generate second-type item request information corresponding to the second-type item slot; and a second sending module, configured to send the second-type item request information to a second game client corresponding to the second game character.

In one possible embodiment, the apparatus further includes:

a third generation module, configured to, in response to a fourth operation for the second-type item slot, generate second-type item gifting information corresponding to the second-type item slot; and a third sending module, configured to send the second-type item gifting information to a second game client corresponding to the second game character.

In one possible embodiment, generating first-type item request information corresponding to the first-type item slot by a first generating module 502 in response to a second operation for the first-type item slot includes:

in response to a second operation for the first-type item slot, determining a target item slot corresponding to the second operation and a request allocation type of the target item slot, and generating first-type item request information of the first game character according to the request allocation type.

In one possible embodiment, generating first-type item request information of the first game character by a first generating module 502 according to the request allocation type includes:

generating first-type item request information of the first game character according to the request allocation type, a first position of the first game character and an item identification of an item corresponding to the target item slot.

In one possible embodiment, the second operation includes one of the following:

a click operation for the first-type item slot;
a drag operation for dragging the first-type item slot to a first designated area; and
a specific operation for the first-type item slot, and a click operation for the first designated area that immediately follows the specific operation right after the specific operation,
where the first designated area corresponds to a request indication identification, the request indication identification is configured to determine a request allocation type of an item corresponding to the item slot.

In one possible embodiment, the third operation includes one of the following:

a double-click operation for the second-type item slot;
a click operation for the second-type item slot, and a click operation for a specific control that immediately follows the specific operation right after the click operation;
a drag operation for dragging the second-type item slot to a first designated area; and
a specific operation for the second-type item slot, and a click operation for the first designated area that immediately follows the specific operation right after the specific operation,
where the first designated area corresponds to a request indication identification, the request indication identification is configured to determine a request allocation type of an item corresponding to the item slot.

In one possible embodiment, the fourth operation includes one of the following:

a drag operation for dragging the second-type item slot to a second designated area; and
a specific operation for the second-type item slot, and a click operation for the second designated area that immediately follows the specific operation right after the specific operation,
where the second designated area corresponds to a presentation indication identification, the presentation indication identification being configured to determine a presentation allocation type of an item corresponding to the item slot.

In one possible embodiment, the item slot includes an item identification of a corresponding item, where the first-type item slot includes a first type of item identification of a corresponding item, and the second-type item slot includes a second type of item identification of a corresponding item, where the second type is different from the first type.

In one possible embodiment, the item at least includes: a weapon, a prop and a healing item, where the prop includes a first prop matched with the weapon and an independent second prop.

In one possible embodiment, the first graphical user interface displays at least part of a game scene of the game; and displaying at least one item slot corresponding to the first game character in the first graphical user interface by a first display module 501 includes:

providing a display interface in the first graphical user interface, the display interface covering part of the game scene in the first graphical user interface; and
displaying an item slot corresponding to the first game character on the display interface, where the first designated area and the second designated area are areas in the display interface.

In one possible embodiment, the display interface includes: a first area, a second area and a designated area, where the first area is configured to display item slots corresponding to the weapon and a first prop matched with the weapon, respectively; the second area is configured for item slots corresponding to an independent second prop and the healing item, respectively; the designated area is configured to determine an allocation type of the item slot; and the second area is arranged adjacent to the first area, and the designated area is arranged adjacent to the second area; and the designated area includes a first indication area and a second indication area.

In one possible embodiment, the apparatus further includes:

a second display module, configured to, if receiving first response information from the second game client for the first item allocation information, display the first response information in the first graphical user interface, and display a second position of a second game character corresponding to the second game client in a small map of the first graphical user interface, where the first item allocation information is at least one of the following sent by the first game client to the second game client: first-type item request information, second-type item request information and second-type item gifting information.

In one possible embodiment, displaying a second position of a second game character corresponding to the second game client in a small map of the first graphical user interface by a second display module includes:

displaying a second position identification at a second position where the second game character is located in a small map of the first graphical user interface, and displaying the second position identification in a second specific manner.

In one possible embodiment, displaying a second position of a second game character corresponding to the second game client in a small map of the first graphical user interface by a second display module includes:

displaying second positions of second game characters corresponding to a plurality of second game clients in a small map of the first graphical user interface;
in response to a fifth operation for the second position, determining a target second game character; and
displaying a second position of the target second game character in a small map of the first graphical user interface.

In one possible embodiment, the apparatus further includes:
a first canceling module, configured to, after displaying a second position of a second game character corresponding to the second game client in a small map of the first graphical user interface, cancel the display of the first response information in the first graphical user interface, and cancel a second position of a second game character corresponding to the second game client displayed in a small map of the first graphical user interface if the display duration of the first response information and the second position meets a preset threshold.

In one possible embodiment, the apparatus further includes:
a second canceling module, configured to, after sending the first-type item request information to a second game client corresponding to the second game character, cancel at least one item slot corresponding to the first game character displayed in the first graphical user interface.

In one possible embodiment, the apparatus further includes:
a third display module, configured to, in response to a second item allocation information sent by the second game client corresponding to the second game character, display the second item allocation information in the first graphical user interface, and display a third position of the second game character corresponding to the second game client in a small map of the first graphical user interface, where the second item allocation information includes at least one of the following: first-type item request information, second-type item request information and second-type item gifting information; and
a fourth sending module, configured to, in response to a sixth operation for the second item allocation information, send second response information to the second game client corresponding to the second game character.

In one possible embodiment, the apparatus further includes:
a fourth display module, configured to, while displaying the second item allocation information in the first graphical user interface, provide a first response control for the second item allocation information in the first graphical user interface, where the sixth operation is a touch operation for the first response control.

In one possible embodiment, displaying a third position of a second game character corresponding to the second game client in a small map of the first graphical user interface by a third display module includes:
displaying a third position identification at a third position where the second game character is located in a small map of the first graphical user interface, and displaying the third position identification in a third specific manner.

In one possible embodiment, the apparatus further includes:
a third canceling module, configured to, after displaying the second item allocation information in the first graphical user interface and displaying a third position of the second game character corresponding to the second game client in a small map of the first graphical user interface, cancel the display of the second item allocation information and the second position if a sixth operation for the second item allocation information is not received within a preset time period.

The in-game information processing apparatus provided in an embodiment of the present disclosure may improve the convenience and accuracy of allocating supplies that are possessed and/or not possessed among teammates in a non-voice function, improve the communication efficiency among teammates in a non-voice function, reduce the complexity of operations for players, and improve the gaming experience of team cooperation.

A fourth embodiment of the present disclosure further provides an in-game information processing apparatus corresponding to the in-game information processing method in the second embodiment. Since the principle of solving the problem by the apparatus in the fourth embodiment of the present disclosure is similar to that of the above in-game information processing method in the second embodiment of the present disclosure, the implementation of the apparatus may refer to the implementation of the method, and the repeated parts are not described again.

Figure 6:
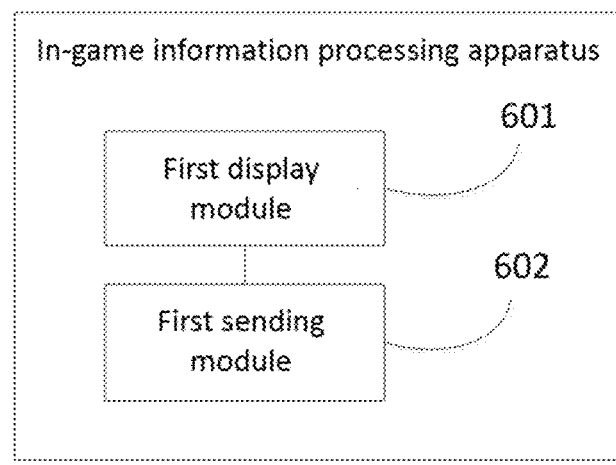
FIG. 6 is a schematic diagram of the structure of another in-game information processing apparatus provided in an embodiment of the present disclosure.

As shown with reference to FIG. 6, the in-game information processing apparatus provided in an embodiment of the present disclosure is illustrated, where the game includes a plurality of game characters, the plurality of game characters including a first game character and a second game character in a same group as the first game character, a second graphical user interface is provided through a second game client corresponding to the second game character, and the apparatus includes:
a first display module 601, configured to, after receiving first item allocation information sent by the first game client corresponding to the first game character, display the first item allocation information in the second graphical user interface, and display a first position of the first game character in a small map of the second graphical user interface, where the first item allocation information includes: first-type item request information, second-type item request information and second-type item gifting information; and
a first sending module 602, configured to, in response to a response operation for the first item allocation information, send first response information for the first item allocation information to the first game client, where, after receiving the first response information, the first game client displays the first response information in the first graphical user interface, and displays a second position of the second game character corresponding to the second game client in a small map of the first graphical user interface.

In one possible embodiment, displaying a first position of the first game character in a small map of the second graphical user interface by a first display module 601 includes:
displaying a first position identification at a first position where the first game character is located in a small map of the second graphical user interface, and displaying the first position identification in a first specific manner.

In one possible embodiment, the apparatus further includes:
a second display module, configured to, while displaying the first item allocation information in the second graphical user interface, provide a second response control for the first item allocation information in the second graphical user interface, where the response operation is a touch operation for the second response control.

The in-game information processing apparatus provided in an embodiment of the present disclosure may improve the convenience and accuracy of allocating supplies that are possessed and/or not possessed among teammates in a non-voice function, improve the communication efficiency among teammates in a non-voice function, reduce the complexity of operations for players, and improve the gaming experience of team cooperation.

Figure 7:
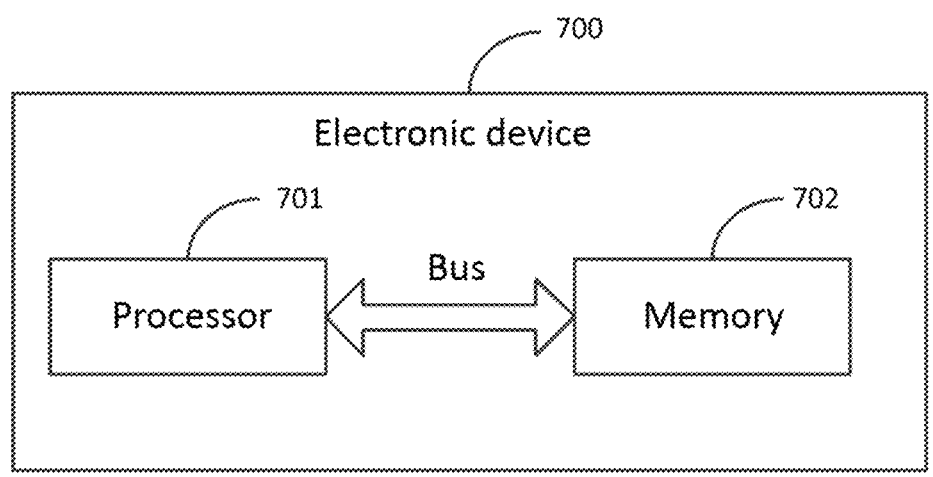
FIG. 7 is a schematic diagram of the structure of an electronic device provided in an embodiment of the present disclosure.

As shown in FIG. 7, a fifth embodiment of the present disclosure provides an electronic device 700 including: a processor 701, a memory 702 and a bus, where the memory 702 has machine-readable instructions stored thereon and executable by the processor 701, when the electronic device is running, the processor 701 and the memory 702 communicate via the bus, and the processor 701 executes the machine-readable instructions to perform steps of the in-game information processing method according to the above first embodiment and second embodiment.

Specifically, the above memory 702 and processor 701 can be general-purpose memory and processor, and are not specifically limited herein, and the processor 701, when executing a computer program stored in the memory 702, can implement the following steps of the in-game information processing method according to the first embodiment described above: in response to a first operation for an item control, displaying at least one item slot corresponding to a first game character in a first graphical user interface, the at least one item slot including a first-type item slot and a second-type item slot, where the first-type item slot represents an item not possessed by the first game character, and the second-type item slot represents an item possessed by the first game character; in response to a second operation for the first-type item slot, generating first-type item request information corresponding to the first-type item slot; and sending the first-type item request information to a second game client corresponding to a second game character. In addition, the processor 701, when executing a computer program stored in the memory 702, can implement the following steps of the in-game information processing method according to the second embodiment described above: after receiving first item allocation information sent by a first game client corresponding to a first game character, displaying first item allocation information in a second graphical user interface, and displaying a first position of the first game character in a small map of the second graphical user interface, where the first item allocation information includes: first-type item request information, second-type item request information and second-type item gifting information; and in response to a response operation for the first item allocation information, sending first response information for the first item allocation information to the first game client, where, after receiving the first response information, the first game client displays the first response information in the first graphical user interface, and displays a second position of the second game character corresponding to the second game client in a small map of the first graphical user interface. The methods and steps in the above embodiments may be implemented in the above method embodiments and will not be described in detail here.

Corresponding to the in-game information processing method described above, a sixth embodiment of the present disclosure further provides a computer-readable storage medium having a computer program stored thereon, where the computer program, when executed by a processor, performs the following steps of the in-game information processing method according to the first embodiment described above: in response to a first operation for an item control, displaying at least one item slot corresponding to a first game character in a first graphical user interface, the at least one item slot including a first-type item slot and a second-type item slot, where the first-type item slot represents an item not possessed by the first game character, and the second-type item slot represents an item possessed by the first game character; in response to a second operation for the first-type item slot, generating first-type item request information corresponding to the first-type item slot; and sending the first-type item request information to a second game client corresponding to a second game character. In addition, the computer program, when executed by a processor, performs the following steps of the in-game information processing method according to the second embodiment described above: after receiving first item allocation information sent by a first game client corresponding to a first game character, displaying first item allocation information in a second graphical user interface, and displaying a first position of the first game character in a small map of the second graphical user interface, where the first item allocation information includes: first-type item request information, second-type item request information and second-type item gifting information; and in response to a response operation for the first item allocation information, sending first response information for the first item allocation information to the first game client, where, after receiving the first response information, the first game client displays the first response information in the first graphical user interface, and displays a second position of the second game character corresponding to the second game client in a small map of the first graphical user interface. The methods and steps in the above embodiments may be implemented in the above method embodiments and will not be described in detail here.

It can be clearly understood by those skilled in the art that, for convenience and simplicity of description, the specific working process of the system and the apparatus described above may refer to the corresponding process in the method embodiment, which will not be described in the present disclosure. In the several embodiments provided in the present disclosure, it should be understood that the disclosed system, apparatus and method may be implemented in other manners. The above described apparatus embodiments are merely illustrative, for example, the division of the modules is only one type of a logical functional division, and other divisions may be achieved in practical use, and for another example, a plurality of modules or components may be combined or integrated into another system, or some features may be omitted or not performed. In addition, the shown or discussed mutual coupling or direct coupling or communication connection may be an indirect coupling or communication connection through some communication interfaces, apparatuses or modules, and may be in an electrical, mechanical or other form.

The modules described as separate parts may be or may not be physically separate, and parts displayed as modules may be or may not be physical units, that is, may be located in one place or may be distributed in a plurality of network units. Some or all of the units may be selected according to actual needs to achieve the purposes of the schemes of the embodiment.

In addition, the functional units in the embodiments of the present disclosure may be integrated into one processing unit, or each unit may exist alone physically, or two or more units are integrated into one unit.

The function, if implemented in a form of a software functional unit and sold or used as an independent product, can be stored in a non-volatile computer-readable storage medium executable by a processor. Based on such understanding, the technical schemes of the present disclosure essentially can be, or part of the technical scheme contributing to the prior art can be, or part of the technical schemes can be embodied in the form of a software product. The computer software product is stored in a storage medium and includes several instructions for enabling a computer device (which can be a personal computer, a server, a network device or the like) to implement all or part of the steps of the method described in the individual embodiments of the present disclosure. The storage medium described above includes a U-disk, a removable hard disk, ROM, RAM, a magnetic disk, an optical disk or other media capable of storing program codes.

In a first aspect, the present disclosure provides an in-game information processing method, where the game includes a plurality of game characters, the plurality of game characters including a first game character and a second game character in a same group as the first game character, a first graphical user interface is provided through a first game client corresponding to the first game character, and the method includes:

in response to a first operation for an item control, displaying at least one item slot corresponding to the first game character in the first graphical user interface, the at least one item slot including a first-type item slot and a second-type item slot, where the first-type item slot represents an item not possessed by the first game character, and the second-type item slot represents an item possessed by the first game character;

in response to a second operation for the first-type item slot, generating first-type item request information corresponding to the first-type item slot; and sending the first-type item request information to a second game client corresponding to the second game character.

In one possible embodiment, the method further includes:

in response to a third operation for the second-type item slot, generating second-type item request information corresponding to the second-type item slot; and sending the second-type item request information to a second game client corresponding to the second game character.

In one possible embodiment, the method further includes:

in response to a fourth operation for the second-type item slot, generating second-type item gifting information corresponding to the second-type item slot; and sending the second-type item gifting information to a second game client corresponding to the second game character.

In one possible embodiment, the generating, in response to a second operation for the first-type item slot, first-type item request information corresponding to the first-type item slot includes:

in response to a second operation for the first-type item slot, determining a target item slot corresponding to the second operation and a request allocation type of the target item slot, and generating first-type item request information of the first game character according to the request allocation type.

In one possible embodiment, the generating first-type item request information of the first game character according to the request allocation type includes:

generating first-type item request information of the first game character according to the request allocation type, a first position of the first game character and an item identification of an item corresponding to the target item slot.

In one possible embodiment, the second operation includes one of the following:

a click operation for the first-type item slot;

a drag operation for dragging the first-type item slot to a first designated area; and a specific operation for the first-type item slot, and a click operation for the first designated area that immediately follows the specific operation right after the specific operation, where the first designated area corresponds to a request indication identification, the request indication identification being configured to determine a request allocation type of an item corresponding to the item slot.

In one possible embodiment, the third operation includes one of the following:

a double-click operation for the second-type item slot;

a click operation for the second-type item slot, and a click operation for a specific control that immediately follows the specific click right after the click operation;

a drag operation for dragging the second-type item slot to a first designated area; and a specific operation for the second-type item slot, and a click operation for the first designated area that immediately follows the specific operation right after the specific operation, where the first designated area corresponds to a request indication identification, the request indication identification being configured to determine a request allocation type of an item corresponding to the item slot.

In one possible embodiment, the fourth operation includes one of the following:

a drag operation for dragging the second-type item slot to a second designated area; and a specific operation for the second-type item slot, and a click operation for the second designated area that immediately follows the specific operation right after the specific operation, where the second designated area corresponds to a presentation indication identification, the presentation indication identification being configured to determine a presentation allocation type of an item corresponding to the item slot.

In one possible embodiment, the item slot includes an item identification of a corresponding item, where the first-type item slot includes a first type of item identification of a corresponding item, and the second-type item slot includes a second type of item identification of a corresponding item, where the second type is different from the first type.

In one possible embodiment, the item at least includes: a weapon, a prop and a healing item, where the prop includes a first prop matched with the weapon and an independent second prop.

In one possible embodiment, the first graphical user interface displays at least part of a game scene of the game; and the displaying at least one item slot corresponding to the first game character in the first graphical user interface includes:

providing a display interface in the first graphical user interface, the display interface covering part of the game scene in the first graphical user interface; and displaying an item slot corresponding to the first game character on the display interface, where the first designated area and the second designated area are areas in the display interface.

In one possible embodiment, the display interface includes: a first area, a second area and a designated area, where the first area is configured to display item slots corresponding to the weapon and a first prop matched with the weapon, respectively; the second area is configured for item slots corresponding to an independent second prop and the healing item, respectively; the designated area is configured to determine an allocation type of the item slot;

the second area is arranged adjacent to the first area, and the designated area is arranged adjacent to the second area; and the designated area includes a first indication area and a second indication area.

In one possible embodiment, the method further includes:
if receiving first response information from the second game client for the first item allocation information, displaying the first response information in the first graphical user interface, and displaying a second position of a second game character corresponding to the second game client in a small map of the first graphical user interface, where the first item allocation information is at least one of the following sent by the first game client to the second game client: first-type item request information, second-type item request information and second-type item gifting information.

In one possible embodiment, the displaying a second position of a second game character corresponding to the second game client in a small map of the first graphical user interface includes:
displaying a second position identification at a second position where the second game character is located in a small map of the first graphical user interface, and displaying the second position identification in a second specific manner.

In one possible embodiment, the displaying a second position of a second game character corresponding to the second game client in a small map of the first graphical user interface includes:
displaying second positions of second game characters corresponding to a plurality of second game clients in a small map of the first graphical user interface;
in response to a fifth operation for the second position, determining a target second game character; and
displaying a second position of the target second game character in a small map of the first graphical user interface.

In one possible embodiment, after displaying a second position of a second game character corresponding to the second game client in a small map of the first graphical user interface, the method further includes:
if the display duration of the first response information and the second position meets a preset threshold, canceling the display of the first response information in the first graphical user interface, and canceling a second position of a second game character corresponding to the second game client displayed in a small map of the first graphical user interface.

In one possible embodiment, after sending the first-type item request information to a second game client corresponding to the second game character, the method further includes:
canceling at least one item slot corresponding to the first game character displayed in the first graphical user interface.

In one possible embodiment, the method further includes:
in response to a second item allocation information sent by the second game client corresponding to the second game character, displaying the second item allocation information in the first graphical user interface, and displaying a third position of the second game character corresponding to the second game client in a small map of the first graphical user interface, where the second item allocation information includes at least one of the following: first-type item request information, second-type item request information and second-type item gifting information; and in response to a sixth operation for the second item allocation information, sending second response information to the second game client corresponding to the second game character.

In one possible embodiment, while displaying the second item allocation information in the first graphical user interface, the method further includes:
providing a first response control for the second item allocation information in the first graphical user interface, where the sixth operation is a touch operation for the first response control.

In one possible embodiment, the displaying a third position of a second game character corresponding to the second game client in a small map of the first graphical user interface includes:
displaying a third position identification at a third position where the second game character is located in a small map of the first graphical user interface, and displaying the third position identification in a third specific manner.

In a second aspect, an embodiment of the present disclosure further provides an in-game information processing method, where the game includes a plurality of game characters, the plurality of game characters including a first game character and a second game character in a same group as the first game character, a second graphical user interface is provided through a second game client corresponding to the second game character, and the method includes:
after receiving first item allocation information sent by a first game client corresponding to the first game character, displaying the first item allocation information in the second graphical user interface, and displaying a first position of the first game character in a small map of the second graphical user interface, where the first item allocation information includes: first-type item request information, second-type item request information and second-type item gifting information; and
in response to a response operation for the first item allocation information, sending first response information for the first item allocation information to the first game client, where, after receiving the first response information, the first game client displays the first response information in the first graphical user interface, and displays a second position of the second game character corresponding to the second game client in a small map of the first graphical user interface.

In one possible embodiment, the displaying a first position of the first game character in a small map of the second graphical user interface includes:
displaying a first position identification at a first position where the first game character is located in a small map of the second graphical user interface, and displaying the first position identification in a first specific manner.

In one possible embodiment, while displaying the first item allocation information in the second graphical user interface, the method further includes:
providing a second response control for the first item allocation information in the second graphical user interface, where the response operation is a touch operation for the second response control.

In a third aspect, an embodiment of the present disclosure further provides an in-game information processing apparatus, where the game includes a plurality of game characters, the plurality of game characters including a first game character and a second game character in a same group as the first game character, a first graphical user interface is provided through a first game client corresponding to the first game character, and the apparatus includes:

a first display module, configured to, in response to a first operation for an item control, display at least one item slot corresponding to the first game character in the first graphical user interface, the at least one item slot including a first-type item slot and a second-type item slot, where the first-type item slot represents an item not possessed by the first game character, and the second-type item slot represents an item possessed by the first game character;

a generating module, configured to, in response to a second operation for the first-type item slot, generate first-type item request information corresponding to the first-type item slot; and a first sending module, configured to send the first-type item request information to a second game client corresponding to the second game character.

In a fourth aspect, an embodiment of the present disclosure further provides an in-game information processing apparatus, where the game includes a plurality of game characters, the plurality of game characters including a first game character and a second game character in a same group as the first game character, a second graphical user interface is provided through a second game client corresponding to the second game character, and the apparatus includes:

a display module, configured to, after receiving item allocation information sent by a first game client corresponding to the first game character, display the item allocation information in the second graphical user interface, and display a first position of the first game character in a small map of the second graphical user interface, where the first item allocation information includes: first-type item request information, second-type item request information and second-type item gifting information; and a sending module, configured to, in response to a response operation for the item allocation information, send first response information for the item allocation information to the first game client, where, after receiving the first response information, the first game client displays the first response information in the first graphical user interface, and displays a second position of the second game character corresponding to the second game client in a small map of the first graphical user interface.

In a fifth aspect, an embodiment of the present disclosure further provides an electronic device including: a processor, a storage medium and a bus, where the storage medium has machine-readable instructions stored thereon and executable by the processor, when the electronic device is running, the processor and the storage medium communicate via the bus, and the processor executes the machine-readable instructions to perform steps of the in-game information processing method according to any one of the first aspect and the second aspect.

In a sixth aspect, an embodiment of the present disclosure further provides a computer-readable storage medium having a computer program stored thereon, where the computer program, when executed by a processor, performs steps of the in-game information processing method according to any one of the first aspect and the second aspect.

According to the in-game information processing method and apparatus, the electronic device and the storage medium provided in the embodiments of the present disclosure, at least one item slot corresponding to a first game character is displayed in a first graphical user interface by responding to a first operation for an item control, the at least one item slot including a first-type item slot and a second-type item slot, where the first-type item slot represents an item not possessed by the first game character, and the second-type item slot represents an item possessed by the first game character; and then in response to a second operation for the first-type item slot, first-type item request information corresponding to the first-type item slot is generated, and the first-type item request information is sent to a second game client corresponding to a second game character. In this way, the convenience and accuracy of allocating supplies that are not possessed among teammates may be improved in a non-voice function, the communication efficiency among teammates may be improved in a non-voice function, the complexity of operations for players may be reduced, and the gaming experience of team cooperation may be improved.

The above description is merely the specific embodiments of the present disclosure, however, the protection scope of the present disclosure is not limited thereto, and any modifications and substitutions that can be easily conceived by those skilled in the art within the technical scope disclosed by the present disclosure shall fall within the protection scope of the present disclosure. Therefore, the protection scope of the present disclosure shall be subject to the protection scope of the claims.

The invention claimed is:

1. An in-game information processing method, comprising:

displaying, in response to a first operation for an item control in a game, at least one item slot corresponding to a first game character in a first graphical user interface, wherein the game comprises a plurality of game characters, the plurality of game characters comprise the first game character and a second game character, the second game character is in a same group as the first game character, the first graphical user interface is provided through a first game client corresponding to the first game character, the at least one item slot comprises a first-type item slot and a second-type item slot, wherein the first-type item slot corresponds to an item not possessed by the first game character, and the second-type item slot corresponds to an item possessed by the first game character;

generating, in response to a second operation for the first-type item slot, first-type item request information corresponding to the first-type item slot; and sending the first-type item request information to a second game client corresponding to the second game character.

2. The in-game information processing method according to claim 1, wherein the method further comprises:

generating, in response to a third operation for the second-type item slot, second-type item request information corresponding to the second-type item slot; and sending the second-type item request information to the second game client corresponding to the second game character.

3. The in-game information processing method according to claim 1,
wherein the method further comprises:
generating, in response to a fourth operation for the second-type item slot, second-type item gifting information corresponding to the second-type item slot; and
sending the second-type item gifting information to the second game client corresponding to the second game character.

4. The in-game information processing method according to claim 1, wherein generating, in response to the second operation for the first-type item slot, the first-type item request information corresponding to the first-type item slot comprises:
determining, in response to the second operation for the first-type item slot, a target item slot corresponding to the second operation and a request allocation type of the target item slot, and generating the first-type item request information of the first game character according to the request allocation type.

5. The in-game information processing method according to claim 4, wherein generating the first-type item request information of the first game character according to the request allocation type comprises:
generating the first-type item request information of the first game character according to the request allocation type, a first position of the first game character and an item identification of an item corresponding to the target item slot.

6. The in-game information processing method according to claim 1, wherein the second operation comprises one of the following operations:
a click operation for the first-type item slot;
a drag operation for dragging the first-type item slot to a first designated area; or
a specific operation for the first-type item slot, and a click operation for the first designated area that immediately follows the specific operation right after the specific operation,
wherein the first designated area corresponds to a request indication identification, the request indication identification being configured to determine a request allocation type of an item corresponding to the item slot.

7. The in-game information processing method according to claim 2, wherein the third operation comprises one of the following operations:
a double-click operation for the second-type item slot;
a click operation for the second-type item slot, and a click operation for a specific control that immediately follows the click operation right after the click operation;
a drag operation for dragging the second-type item slot to a first designated area; or
a specific operation for the second-type item slot, and a click operation for the first designated area that immediately follows the specific operation right after the specific operation,
wherein the first designated area corresponds to a request indication identification, the request indication identification being configured to determine a request allocation type of an item corresponding to the item slot.

8. The in-game information processing method according to claim 3, wherein the fourth operation comprises one of the following operations:
a drag operation for dragging the second-type item slot to a second designated area; or
a specific operation for the second-type item slot, and a click operation for the second designated area that immediately follows the specific operation right after the specific operation,
wherein the second designated area corresponds to a presentation indication identification, the presentation indication identification being configured to determine a presentation allocation type of an item corresponding to the item slot.

9. The in-game information processing method according to claim 1, wherein the item slot comprises an item identification of a corresponding item, wherein the first-type item slot comprises a first type of item identification of a corresponding item, and the second-type item slot comprises a second type of item identification of a corresponding item, wherein the second type is different from the first type.

10. The in-game information processing method according to claim 1, wherein the item comprises: a weapon, a prop and a healing item, wherein the prop comprises a first prop matched with the weapon and an independent second prop.

11. The in-game information processing method according to claim 7, wherein the first graphical user interface displays at least part of a game scene of the game; and
wherein displaying the at least one item slot corresponding to the first game character in the first graphical user interface comprises:
providing a display interface in the first graphical user interface, wherein the display interface covers part of the game scene in the first graphical user interface; and
displaying an item slot corresponding to the first game character on the display interface, wherein the first designated area and a second designated area are areas in the display interface.

12. The in-game information processing method according to claim 11, wherein the display interface comprises: a first area, a second area and a designated area, wherein the first area is configured to display item slots corresponding to a weapon and a first prop matched with the weapon, respectively; the second area is configured for item slots corresponding to an independent second prop and a healing item, respectively; and the designated area is configured to determine an allocation type of the item slot; and
the second area is disposed adjacent to the first area, and the designated area is disposed adjacent to the second area; and the designated area comprises a first indication area and a second indication area.

13. The in-game information processing method according to claim 1, wherein the method further comprises:
displaying first response information in the first graphical user interface, if in response to receiving the first response information from the second game client for a first item allocation information, and displaying a second position of the second game character corresponding to the second game client in a small map of the first graphical user interface, wherein the first item allocation information is at least one of following sent by the first game client to the second game client: first-type item request information, second-type item request information and second-type item gifting information.

14. The in-game information processing method according to claim 13, wherein displaying the second position of the second game character corresponding to the second game client in the small map of the first graphical user interface comprises:
displaying a second position identification at the second position where the second game character is located in the small map of the first graphical user interface, and displaying the second position identification in a second specific manner.

15. The in-game information processing method according to claim 13, wherein displaying the second position of the second game character corresponding to the second game client in the small map of the first graphical user interface comprises:
displaying second positions of second game characters corresponding to a plurality of second game clients in the small map of the first graphical user interface;
determining, in response to a fifth operation for the second position, a target second game character; and
displaying a second position of the target second game character in the small map of the first graphical user interface.

16. The in-game information processing method according to claim 13, wherein the method further comprises:
canceling, in response to determining that a display duration of the first response information and the second position meets a preset threshold, display of the first response information in the first graphical user interface, and canceling the second position of the second game character corresponding to the second game client displayed in the small map of the first graphical user interface.

17. An in-game information processing method, comprising:
displaying, in response to receiving first item allocation information sent by a first game client corresponding to a first game character, the first item allocation information in a second graphical user interface, and displaying a first position of a first game character in a small map of the second graphical user interface, wherein the game comprises a plurality of game characters, the plurality of game characters comprising the first game character and the second game character in a same group as the first game character, wherein the second graphical user interface is provided through a second game client corresponding to the second game character, wherein the first item allocation information comprises: first-type item request information, second-type item request information and second-type item gifting information; and
sending, in response to a response operation for the first item allocation information, first response information for the first item allocation information to the first game client, wherein, after receiving the first response information, the first game client displays the first response information in a first graphical user interface, and displays a second position of the second game character corresponding to the second game client in a small map of the first graphical user interface.

18. The in-game information processing method according to claim 17, wherein displaying the first position of the first game character in the small map of the second graphical user interface comprises:
displaying a first position identification at the first position in the small map of the second graphical user interface wherein the first game character is located at the first position, and displaying the first position identification in a first specific manner.

19. The in-game information processing method according to claim 17, wherein the method further comprises:
providing a second response control for the first item allocation information in the second graphical user interface, wherein the response operation is a touch operation for the second response control.

20. A non-transitory computer-readable storage medium, having a computer program stored thereon, wherein the computer program, when executed by a processor, performs steps of an in-game information processing method, wherein the method comprises:
displaying, in response to a first operation for an item control in a game, at least one item slot corresponding to a first game character in a first graphical user interface, wherein the game comprises a plurality of game characters, the plurality of game characters comprise the first game character and a second game character, the second game character is in a same group as the first game character, the first graphical user interface is provided through a first game client corresponding to the first game character, the at least one item slot comprises a first-type item slot and a second-type item slot, wherein the first-type item slot corresponds to an item not possessed by the first game character, and the second-type item slot corresponds to an item possessed by the first game character;
generating, in response to a second operation for the first-type item slot, first-type item request information corresponding to the first-type item slot; and
sending the first-type item request information to a second game client corresponding to the second game character.

* * * * *